(No Model.)
F. BROYER & P. PETIT.
APPARATUS FOR AGING AND RECTIFYING ALCOHOLIC LIQUIDS BY OZONE.
No. 468,326. Patented Feb. 9, 1892.
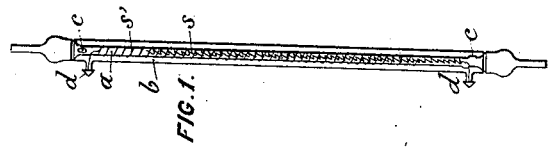
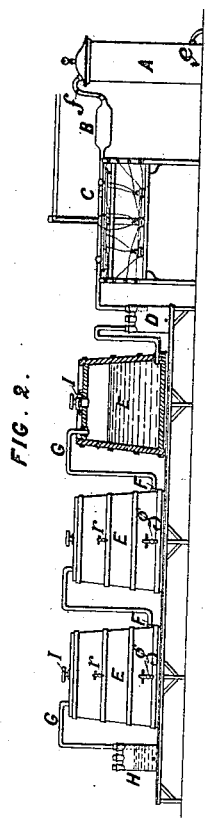
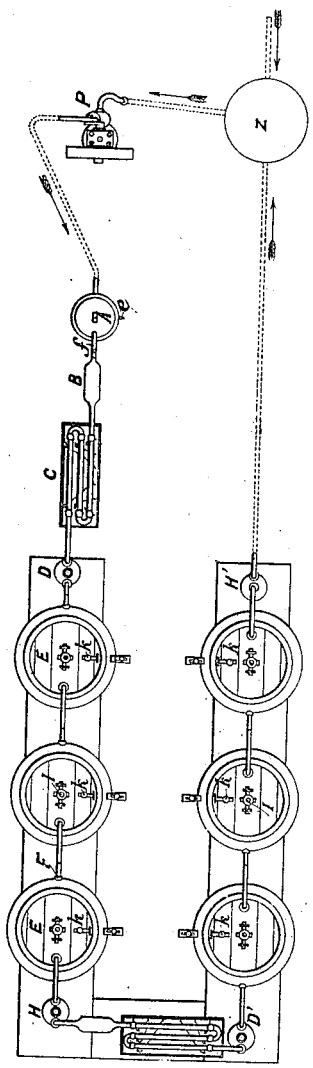
WITNESSES.
John Becker
Fred White
INVENTORS:
François Broyer and
Paul Petit,
By their Attorneys

UNITED STATES PATENT OFFICE.

FRANÇOIS BROYER AND PAUL PETIT, OF TOURNUS, ASSIGNORS TO THE COMPAGNIE FRANCAISE DES EAUX-DE-VIE L. TEILLIARD, OF PARIS, FRANCE.

APPARATUS FOR AGING AND RECTIFYING ALCOHOLIC LIQUIDS BY OZONE.

SPECIFICATION forming part of Letters Patent No. 468,326, dated February 9, 1892.

Application filed November 6, 1890. Serial No. 370,619. (No model.) Patented in France August 5, 1886, No. 177,796; in England November 22, 1886, No. 15,175; in Belgium November 27, 1886, No. 75,400; in Luxemburg December 1, 1886, No. 769; in Sweden December 13, 1886, No. 1,099, and in Spain June 7, 1888, No. 7,955.

*To all whom it may concern:*

Be it known that we, FRANÇOIS BROYER, manufacturer, and PAUL PETIT, merchant, both citizens of the French Republic, and residents of Tournus, Saône-et-Loire, France, have invented certain new and useful Improvements in Apparatus for Aging and Rectifying Alcoholic Liquids by Ozone, of which the following is a specification.

This invention has been patented in France by patent dated August 5, 1886, No. 177,796; in England by patent dated November 22, 1886, No. 15,175; in Belgium by patent dated November 27, 1886, No. 75,400; in Luxemburg by patent dated December 1, 1886, No. 769; in Sweden by patent dated December 13, 1886, No. 1,099, and in Spain by patent dated June 7, 1888, No. 7,955.

This invention relates to apparatus for the manufacture of ozone and for the treatment of liquids with ozone.

In the accompanying drawings, which illustrate the preferred form of my invention, Figure 1 is an axial section of one of the ozone-generators. Fig. 2 is a side elevation, partly in vertical mid-section, showing an installation of apparatus for generating ozone and treating liquids therewith; and Fig. 3 is a plan view of the apparatus shown in Fig. 2.

Referring to the drawings, we will now describe our invention.

The apparatus which forms the subject of this invention consists of two distinct parts: first, the tube for producing ozone; second, the apparatus serving for the use of ozone for aging and purifying alcoholic liquors—such as pure alcohol, flegmas, brandy of all kinds and strengths, kirschwasser, rum, absinthe, whisky, gin, and generally all liquids for consumption that contain alcohol.

The two apparatus work in combination in the application of ozone for aging and rectifying alcoholic liquids.

The ozone-tube, Fig. 1, is composed of two aluminium spirals $s\,s'$, placed one within and the other external to a glass tube $a$ and of the said tube, which is about one centimeter in diameter and forty-five centimeters long. The whole is inclosed in a second tube $b$, also of glass, having its two ends cemented to those of the first-named one. Small openings $c$ are pierced in the interior tube $a$ near the cemented joints, establishing the communication between the two tubes $a$ and $b$. The opposite extremities of the two spirals $s\,s'$ are connected to the screw-terminals $d\,d$, situated outside the large tube $b$. If these two terminals are connected to the secondary circuit of an induction-coil excited by any suitable source of electricity and a current of oxygen be made to circulate through the tubes while subject to the influence of the invisible electric discharges that take place between the two aluminium spirals, the oxygen will be transformed into ozone.

The ozone apparatus consists of three tubes similar to those above described and placed in tension—that is to say, the outlet of one is connected to the inlet of the next, as shown in Figs. 2 and 3 at C. Each tube is actuated by a separate induction-coil. The primary circuits of the induction-coils are arranged in shunt-circuit on the dynamo-circuit. The oxygen used passes successively through each of the three tubes, becoming more and more ozonized as it passes through each one.

We will now describe the complete apparatus. (Shown in elevation at Fig. 2 and in plan at Fig. 3.)

The oxygen taken from a gas-holder Z by means of a gas-pump P is forced into a reservoir A. This reservoir is provided at its upper part with a pressure-gage for indicating the pressure. It is provided at its lower part with a cock $e$, serving for the discharge of watery vapors carried with the oxygen. This reservoir is of galvanized sheet-iron. The oxygen issues from it by a tinned lead tube $f$, in order to pass into a glass receiver B, containing chloride of calcium, serving to absorb entirely the moisture of the gas. This receiver is connected to the ozone apparatus C, above described. The oxygen passes through this apparatus and issues from it transformed into ozone and passes into a glass Woulfe bottle D. This bottle, which is always empty, serves as a safety-vessel for preventing the escape of the liquid or its return into the ozone-tube, which return might take place owing to the fracture of a tube, which would stop the pressure.

Beyond the Woulfe bottle are three wooden vessels E E E, hooped with iron, which contain about five hundred and fifty liters, (the capacity may be increased or decreased, according to the requirements of the installation.) These three vessels are filled with the liquid to be treated up to a cock r for regulating the level. These cocks are indicated on two vessels in the vertical plane and by the levels of the liquid in the first vessel. The first of these three vessels, which are perforated at F F F on the sides, receives the ozone under pressure through a glass tube, and the ozone in escaping into the liquid produces a gyratory motion of the latter. The ozone issues from the liquid at the upper part through a glass tube G into the second vessel at F, producing the same action as in the first one, and then passing into the third vessel for operating in the same manner. On issuing from the third vessel the gas passing through the tube G enters a Woulfe bottle H, half-filled with water, where it is washed and made to give up the alcoholic vapors which it carried with it.

If the works are not of an extent to require a larger apparatus, the ozone under the action of the pressure issues from the bottle H to return to the gas-holder in the same way as is shown at the bottle H' of the second apparatus. If it is necessary to produce a greater quantity, the oxygen on issuing from the bottle H passes into another glass receiver containing chloride of calcium, passes through a second ozone-tube similar to the first one, where a part of the oxygen is again converted into ozone, and operates upon three other vessels charged with liquid in the same manner as above described and returns from the bottle H' to the gas-holder.

The wooden vessels have the form of truncated cones. The introduction of the liquid is effected at the closed upper end by means of openings closed by stoppers pressed down by a strap I I I. Each vessel has a wooden cock k k k, allowing the pressure existing therein to be discharged when the action of the apparatus is stopped. Each vessel has a discharge-cock g at its lower part. All the tubes are of glass. The stoppers of the glass Woulfe bottles D, H, D', and H' are of cork.

What we claim is—

The combination of the oxygen-holder Z, the oxygen-reservoir A, the pump P for forcing the oxygen into the reservoir A and maintaining the pressure therein, the receiver B, into which the oxygen passes from the reservoir A, said receiver containing a moisture-absorbent, the ozonizer C, into which the oxygen passes from the receiver B and wherein a portion of the oxygen is converted into ozone, the empty Woulfe bottle D, into which the gas enters from the ozonizer and which prevents the liquor under treatment from being forced back into the ozonizer, the series of vessels E E E, each partly filled with the liquor to be treated, pipe connections connecting said Woulfe bottle D with the first of said vessels and said vessels in series, whereby the gas is introduced at the bottom of each vessel and passes out from the top thereof, the Woulfe wash-bottle H, partly filled with water, for retaining any alcoholic vapors carried along with the gas, a pipe connection between the last vessel E of the series and said wash-bottle H, which leads the gas from the top of the last vessel to the wash-bottle H, and a pipe connection between said wash-bottle H and the gas-holder Z for returning the oxygen to said holder Z, substantially as set forth.

In witness whereof we have hereunto signed our names in the presence of two subscribing witnesses.

FRANÇOIS BROYER.
PAUL PETIT.

Witnesses:
JOSEPH BERGER,
JEAN MARIE BRATTE.